(12) United States Patent
Myka et al.

(10) Patent No.: US 7,685,134 B2
(45) Date of Patent: Mar. 23, 2010

(54) MEDIA FILE SHARING, CORRELATION OF METADATA RELATED TO SHARED MEDIA FILES AND ASSEMBLING SHARED MEDIA FILE COLLECTIONS

(75) Inventors: Andreas Myka, Helsinki (FI); Christian Lindholm, Helsinki (FI)

(73) Assignee: Nokia Corporation, Espoo (FI)

( * ) Notice: Subject to any disclaimer, the term of this patent is extended or adjusted under 35 U.S.C. 154(b) by 1273 days.

(21) Appl. No.: 10/749,652

(22) Filed: Dec. 31, 2003

(65) Prior Publication Data

US 2005/0165795 A1   Jul. 28, 2005

(51) Int. Cl.
  *G06F 7/00* (2006.01)
  *G06F 17/00* (2006.01)
(52) U.S. Cl. .............. 707/100; 707/9; 707/10; 707/201; 348/211.3; 348/231.3
(58) Field of Classification Search .......... 707/9, 707/10, 100, 201; 348/211.3, 231.3
See application file for complete search history.

(56) References Cited

U.S. PATENT DOCUMENTS

| | | | |
|---|---|---|---|
| 6,275,831 B1 | 8/2001 | Bodnar et al. | |
| 2002/0197993 A1* | 12/2002 | Cho et al. | 455/435 |
| 2003/0021591 A1* | 1/2003 | Grosvenor et al. | 386/124 |
| 2003/0023725 A1* | 1/2003 | Bradfield et al. | 709/225 |
| 2003/0037125 A1* | 2/2003 | Luman et al. | 709/220 |
| 2003/0093422 A1* | 5/2003 | Yamamoto et al. | 707/3 |
| 2003/0125063 A1* | 7/2003 | Svensson et al. | 455/517 |
| 2003/0156591 A1* | 8/2003 | Sorsa | 370/401 |
| 2003/0158753 A1 | 8/2003 | Bernston et al. | |
| 2003/0236890 A1* | 12/2003 | Hurwitz et al. | 709/227 |
| 2004/0044774 A1* | 3/2004 | Mangalik et al. | 709/227 |
| 2004/0087326 A1* | 5/2004 | Dunko et al. | 455/517 |
| 2004/0128324 A1* | 7/2004 | Sheynman et al. | 707/200 |
| 2004/0203797 A1* | 10/2004 | Burr | 455/445 |

FOREIGN PATENT DOCUMENTS

| | | |
|---|---|---|
| EP | 1 271 841 A2 | 1/2003 |
| WO | WO 01/39053 A2 | 5/2001 |
| WO | WO 03/058923 A2 | 7/2003 |
| WO | WO 2004/075169 A2 | 9/2004 |

\* cited by examiner

*Primary Examiner*—Tim T. Vo
*Assistant Examiner*—Jay A Morrison
(74) *Attorney, Agent, or Firm*—Alston & Bird LLP

(57) ABSTRACT

The present invention provides for systems and methods for communicating media files and creating a collection of media files, also referred to herein as a master media file. In addition, the systems and methods of the present invention provide for the creation of automatic metadata and compilation of metadata associated with the collection of media files. The present invention is able to bond devices, referred to herein as slave devices, such as media capture devices, presence devices and/or sensor devices and instruct the slave devices, particularly the media capture devices, to communicate captured media files with a specified set of metadata included.

20 Claims, 10 Drawing Sheets

Bonding in Proximity

MEDIA FILE SHARING, CORRELATION OF METADATA RELATED TO SHARED MEDIA FILES AND ASSEMBLING SHARED MEDIA FILE COLLECTIONS

FIELD OF THE INVENTION

The present invention relates to digital communication and, more specifically, to an application for providing media file sharing, correlation and aggregation of metadata related to shared media files and assembly of shared media files collections.

BACKGROUND OF THE INVENTION

The rapid growth of digital communication has made it possible for all kinds of digital media items to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital media items that will be communicated amongst these devices will increase at an alarming rate.

In addition to the onset of more and more digital devices possessing digital communication capabilities and/or digital media capture capabilities; the digital storage capacity of these devices is constantly increasing. In the near future the majority of mobile digital communication terminals may well be equipped with storage capacity in the gigabyte range or greater, allowing these devices to store an enormous amount of digital data. In this environment it will no longer be prohibitive from a memory capacity standpoint to store a voluminous amount of large file types, such as video, audio or other multimedia files.

In the digital communication environment where more and more digital devices, both wireless and wired, are equipped with a means for digital communication and/or digital media capture and where the storage capacity of these devices has become seemingly endless, the digital communication device will encounter and store innumerable digital media files. As such, the digital communication device will desire a means to access, store, manage and further communicate these digital files in an efficient and user-friendly environment.

Wireless digital communication has recently experienced a growth due to the onset of new technologies, such as Bluetooth®, Wi-Fi (also known as 802.11) and other wireless local area networks (WLANs). These new technologies have provided an alternative in wireless networking over the previous fixed long-range microwave transmitter based delivery of network connections.

Bluetooth® is a wireless specification delivering short-range radio communication between electronic devices that are equipped with specialized Bluetooth-enabled semiconductor chips. It lets nearly all devices talk to one another by creating a common language between them. All electronic device such as cellular phones, personal data assistants (PDAs), pagers, and any other device equipped with the Bluetooth-enabled chip can communicate and connect using Bluetooth® technology to form a private, personal area network (PAN). The devices carrying Bluetooth-enabled chips can easily transfer data at a rate of about 720 Kbps (kilobits per second) within 10 meters (33 feet) of range through walls, clothing and other objects. The interaction between devices occurs by itself without direct human intervention whenever they are within each other's range. In this process, the software technology embedded in the Bluetooth® transceiver chip, referred to as link controller, triggers an automatic connection to deliver and accept the data flow.

Whenever devices carrying Bluetooth® technology are within each other's range, they create an automatic ad hoc PAN (personal area network) called a piconet. In this arrangement, one device acts as the "master", while other devices function as "slaves". A piconet normally carries up to eight devices. The master device decides if a particular communication service is needed from a slave device. At the time when a connection is made between Bluetooth® devices, an exchange of unique Bluetooth identity called global ID takes place. A device global ID indicates its profile along with capability functions. Upon matching of the device profile a connection is made and as the devices exchange data, the Bluetooth® transceiver chip hops back and forth among frequencies.

Bluetooth's key features are robustness, low complexity, low power and low cost. Designed to operate in noisy frequency environments, the Bluetooth-enabled devices use a fast acknowledgement and frequency hopping scheme to make the link robust. Because Bluetooth-enabled devices operate in the unlicensed ISM band at 2.4 GHz, they avoid interference from other signals by hopping to a new frequency after transmitting or receiving a packet.

Wi-Fi (wireless fidelity) is used to describe products that follow the 802.11 set of standards developed by the Institute of Electrical and Electronic Engineers (IEEE). The most popular of these is 802.11b, which operates in the 2.4 GHz band and transfers data at 11 megabits per second (Mbps). The emerging 802.11a standard operates in the 5 GHz band and can transfer data up to 54 Mbps. These technologies have a range of about 300 feet. Wi-Fi enabled devices can send and receive data wirelessly from any location equipped with Wi-Fi access. Wi-Fi access is provided through access points, installed within a Wi-Fi location, that transmit an RF signal to Wi-Fi enabled devices that are within range of the access point, which is about 300 feet. The speed of the transmission is governed by the speed of the pipeline fed into the access point.

These advanced wireless communication mediums make it possible for digital communication devices to communicate and transfer information between all devices within the wireless local area network (WLAN). Since recognition of devices in the WLAN is automatic, the amount of information that can be exchanged between communication devices in a WLAN environment is limitless.

Thus, the need exists to develop a system, application and method for sharing media files, correlating the metadata information related to the shared media files and assembling a collection of the shared. The desired application will be implemented on any digital communication device capable of communicating in some form of wireless local area network. A further need exists to develop an application that will provide the ability to automatically receive and transfer media files to other devices within the wireless local area network.

BRIEF SUMMARY OF THE INVENTION

The present invention provides for systems and methods for communicating media files and creating a collection of media files, also referred to herein as a master media file. In addition, the systems and methods of the present invention provide for the creation of automatic metadata and compilation of metadata associated with the collection of media files. The present invention is able to bond devices, referred to herein as slave devices, such as media capture devices, presence devices and/or sensor devices and instruct the slave devices, particularly the media capture devices, to communicate captured media files with a specified set of metadata included. In addition the invention is capable of collecting media files and related media file metadata in a media file collection application, which correlates and/or combines the media files and the related media file metadata to result in a master media file and an associated master metadata file. The master media file and master metadata data file may be communicated back to the slave devices or it may be communicated to other non-bonded devices.

In one embodiment of the invention a digital device, typically a mobile terminal is defined. The device includes a data processor and a communication transceiver in communication with the data processor that is capable of monitoring an environment and receiving communications from one or more devices in the environment. The data processor will execute a bonding application that provides for the bonding of the digital device to devices in the environment and provides for recordation of information related to the bonded devices and information related to the users of the bonded devices. The data processor will additionally execute a media transfer application that provides for the creation of media file transfer parameters that include instructions for creation of media file metadata information. The media file transfer parameters will typically be communicated from the digital device to the bonded devices. The media file transfer parameters may additionally include instructions for transmitting media files captured at the bonded devices. The device will additionally include a memory unit that is in communication with the data processor and stores the information recorded by the bonding application as bonded device metadata information.

The digital device may be configured to include a media capture device, such as a camera, video recorder, audio recorder or the like, or the digital device may be configured without a media capture device. In one embodiment that includes a media capture device, the digital device may include a display and a grouping application executed by the processor. The grouping application may provide for display of a group mode menu structure that allows a device user to define a group event. In addition the grouping application may provide for creation of a group file for storage of media files associated with the event. Alternatively, the grouping application may provide for display of a group mode menu structure that allows a user to communicate stored media files and media file metadata information to the bonded devices or to automatically communicate, upon capture, media files and media file metadata information to the bonded devices.

The digital device may additional include a metadata correlation application that combines the captured media file metadata information with the bonded device metadata information. In this regard, the communication transceiver will communicate the captured media files and the combined metadata to remote devices. The remote devices may be the bonded devices, non-bonded devices or a combination of bonded and non-bonded devices as defined by the digital device and/or the bonded devices. Instructions on which remote devices will receive the files and metadata may be defined in the bonded device metadata information.

The digital device may additionally include a media file collection application that organizes media files received from the one or more bonded devices according to the media file metadata information.

The invention is further embodied in a method for wireless bonding of devices and communicating media file transfer parameters. The method includes the steps of monitoring, at a master device, an area of interest for the presence of potential bondable devices and receiving, at the master device, a presence signal from a potential bondable device. Upon receipt of the presence signal a determination is made as to the bond capability of the potential bondable device and approval or non-approval of the potential bondable device occurs. The determination of the capabilities may occur at the master device or at the potential bondable device. Once a device is bonded or while the approval process is occurring, the master device will communicate to the bonded device media file transfer parameters, including definition of the media file metadata that is to be included with a captured media file. The media file transfer parameters may additionally include the destination addresses for communicating captured media files. The destination address may include the master device or intermediary devices.

An alternate embodiment of the invention is defined by a method for communicating media files and associated media file metadata from a bonded device to a master device. The method comprises bonding the slave device to a master device according to predetermined media file transfer parameters and communicating media files from the bonded devices to remote devices, the media files having metadata information as defined by the predetermined media file transfer parameters. The remote devices may include the master device or other auxiliary devices. The method may further include the step of combining, at one of the remote devices, the media files into a master media file and combining, at one of the remote devices, the metadata information of the media files into a master metadata file. The method may also include the step of recording, at the master device, metadata information related to the one or more bonded devices and the step of correlating, at the remote devices, the bonded device metadata information with the media file metadata information.

In yet another embodiment of the invention, a method is defined for communicating media files and associated media file metadata from a master device to a bonded device. The method includes the steps of bonding remote devices to a master device according to predetermined media file transfer parameters and recording, at the master device, bonded device metadata information. The method further includes the steps of creating a media file at the master device having associated media file metadata information and communicating the media file, the media file metadata and the bonded device metadata information from the master device to the bonded devices. The method may further include the step of combining, at the master device, the bonded device metadata information and the media file metadata information.

The invention is also embodied in a system for communicating media files and assembling a collection of associated media files. The system includes a master device that monitors an environment for slave devices and includes a processor that executes a bonding application to bond the master device to slave devices, a memory device in communication with the processor that stores metadata information related to slave devices and the users of the slave devices and a media transfer application that provides for media file transfer parameters that include instructions for creation of media file metadata information. The media file transfer parameters will typically be communicated from the master device to the slave devices. The system additionally includes slave devices that are bonded to the master device by successful execution of the bonding application. The slave devices may communicate the captured media files to the devices by wireless communication including, but not limited to, Bluetooth, wireless local area network (WLAN), radio frequency identification (RFID) and wireless telecom network.

In one embodiment of the system the slave devices capture media files and communicate the captured media files to remote devices that include processors that execute a media file collection application. The remote device may be the master device or an auxiliary device. The media file collection application typically includes a computer readable storage medium having computer-readable program instructions embodied in the medium. The computer-readable program instructions may include instructions for categorizing the media files in relation to the metadata information, instructions for assembling the media files in a master media file, instructions for communicating the master media file to the slave devices and/or non-bonded devices, instructions for combining metadata related to the captured media files to form a master metadata file.

In an alternate embodiment of the system the master device will include a media capture device that captures media files having associated media file metadata information. In such embodiments, the master device may include a grouping application; the group application is executed by the processor and provides for display of a group mode menu structure that allows a device user to define a group event, store media files associated with the event in a group file and communicate stored media files and media file metadata information to the bonded devices. Additionally, the grouping application may allow a device user to select an automatic communication mode that automatically communicates, upon capture, media files and media file metadata information to the bonded devices.

The slave devices may communicate the captured media files to one or more devices by wireless communication chosen from the group consisting of Bluetooth, wireless local area network (WLAN), radio frequency identification (RFID) and wireless telecom network.

A further embodiment of the invention is defined by a system for communicating media files and assembling a collection of media files. The system includes a master device that provides bonding capability, a media file collection application in communication with the master device and slave devices that bond with the master device and communicate with the master device during a bond period. The slave devices capture media files during the bond period and communicate the captured media files and associated media file metadata to the media file collection application. The media file collection application includes a computer readable storage medium having computer-readable program instructions embodied in the medium. The computer-readable program instructions include instructions for combining a plurality of media files communicated from the one or more slave devices to form a collection of media files associated with the bond period. The slave devices will typically capture media files during the bond period and communicate the captured media files and associated media file metadata to the master device or an auxiliary device.

The media file collection application may further include instructions for correlating the media file metadata, and/or the media file metadata and calendar event data, instructions for combining the media file metadata to form a master metadata file related to the media files captured during the bond period.

Thus, the present invention provides for a system for bonding devices within the general vicinity of one another and communicating media files from one device to another, such that the communicated media files can be assembled in a collection and the metadata associated with the devices and the files can be correlated and combined in a master metadata file. The collection of media files and/or master metadata file can then be communicated back to the bonded device or communicated to other non-bonded devices.

BRIEF DESCRIPTION OF THE DRAWINGS

Figure 1:
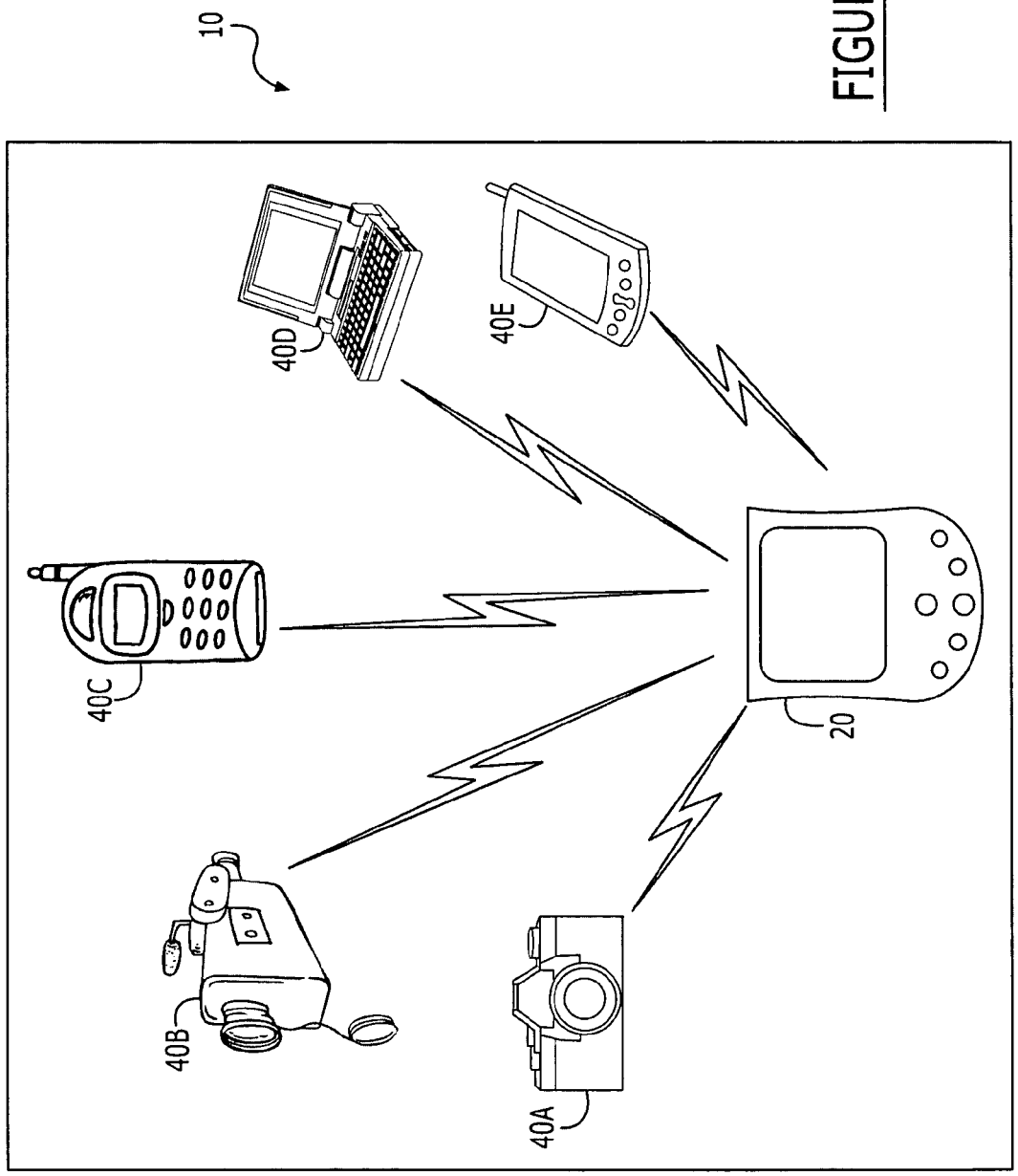

Having thus described the invention in general terms, reference will now be made to the accompanying drawings, which are not necessarily drawn to scale, and wherein:

FIG. 1 is an illustration of a digital devices in media file sharing system, in accordance with embodiments of the present invention.

Figure 2:
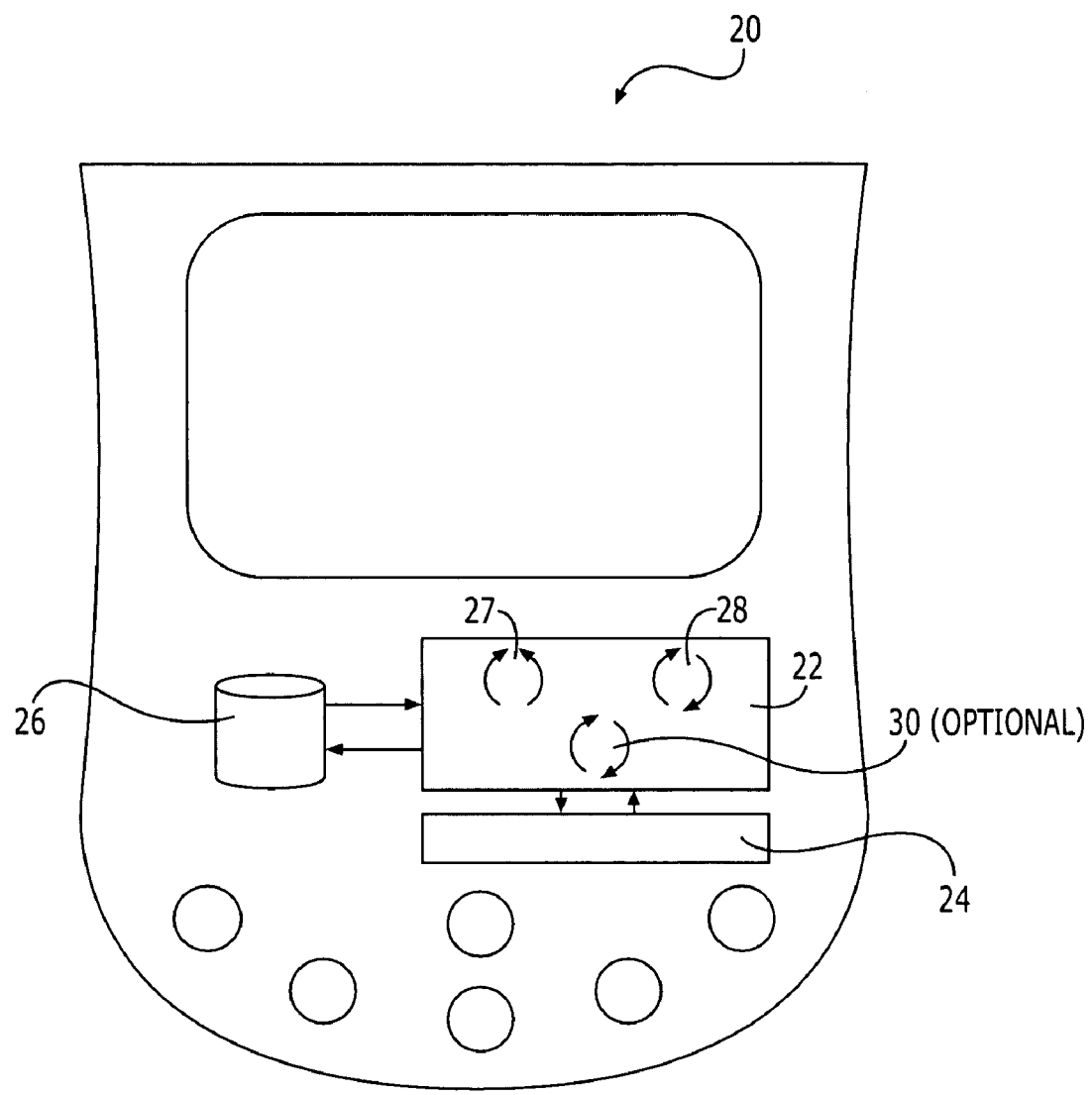

FIG. 2 is an illustration of a master device/digital device, in accordance with an embodiment of the present invention.

Figure 3:
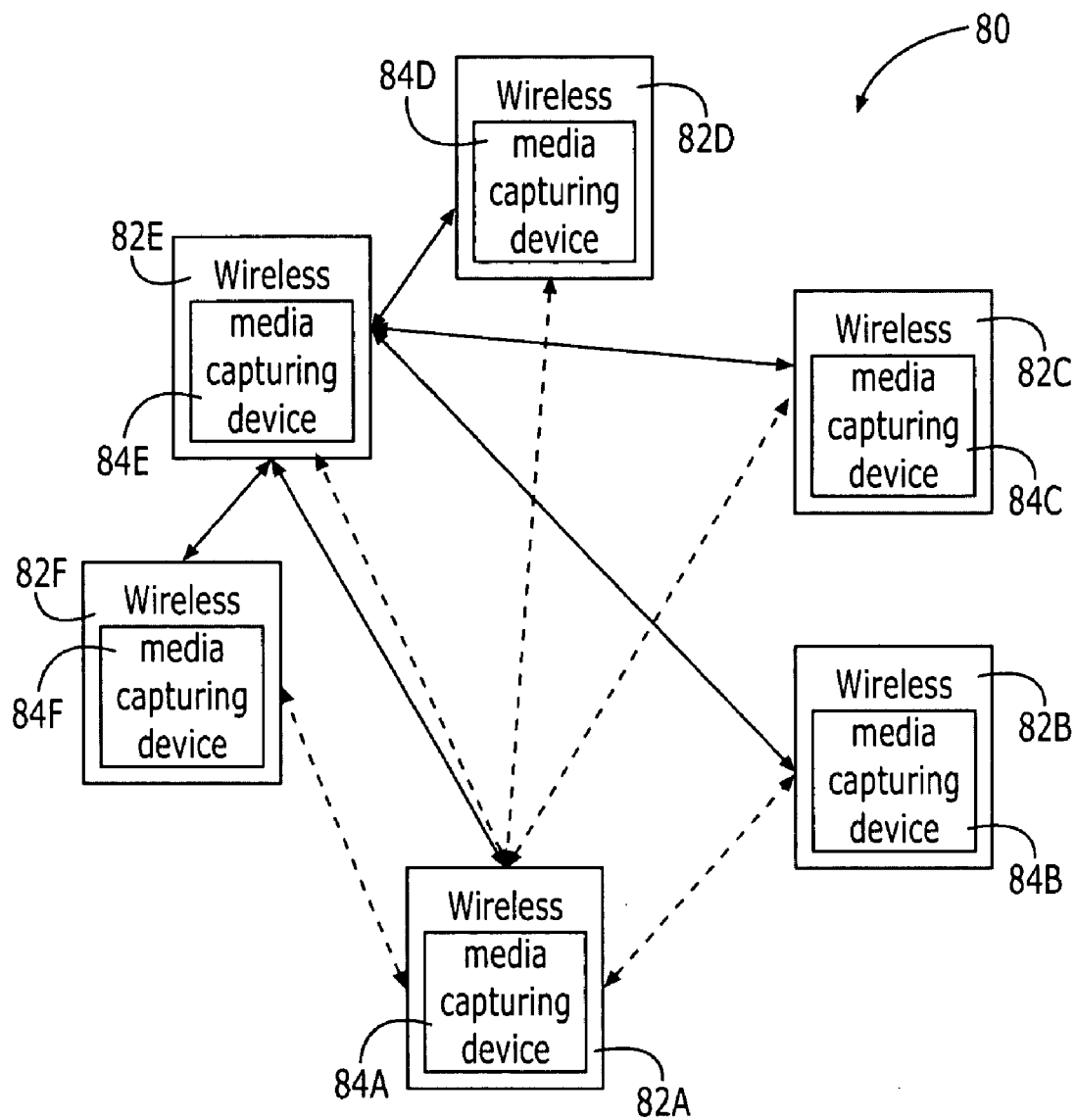

FIG. 3 is an illustration of digital devices in a media file sharing system, in accordance with an embodiment of the present invention.

Figure 4:
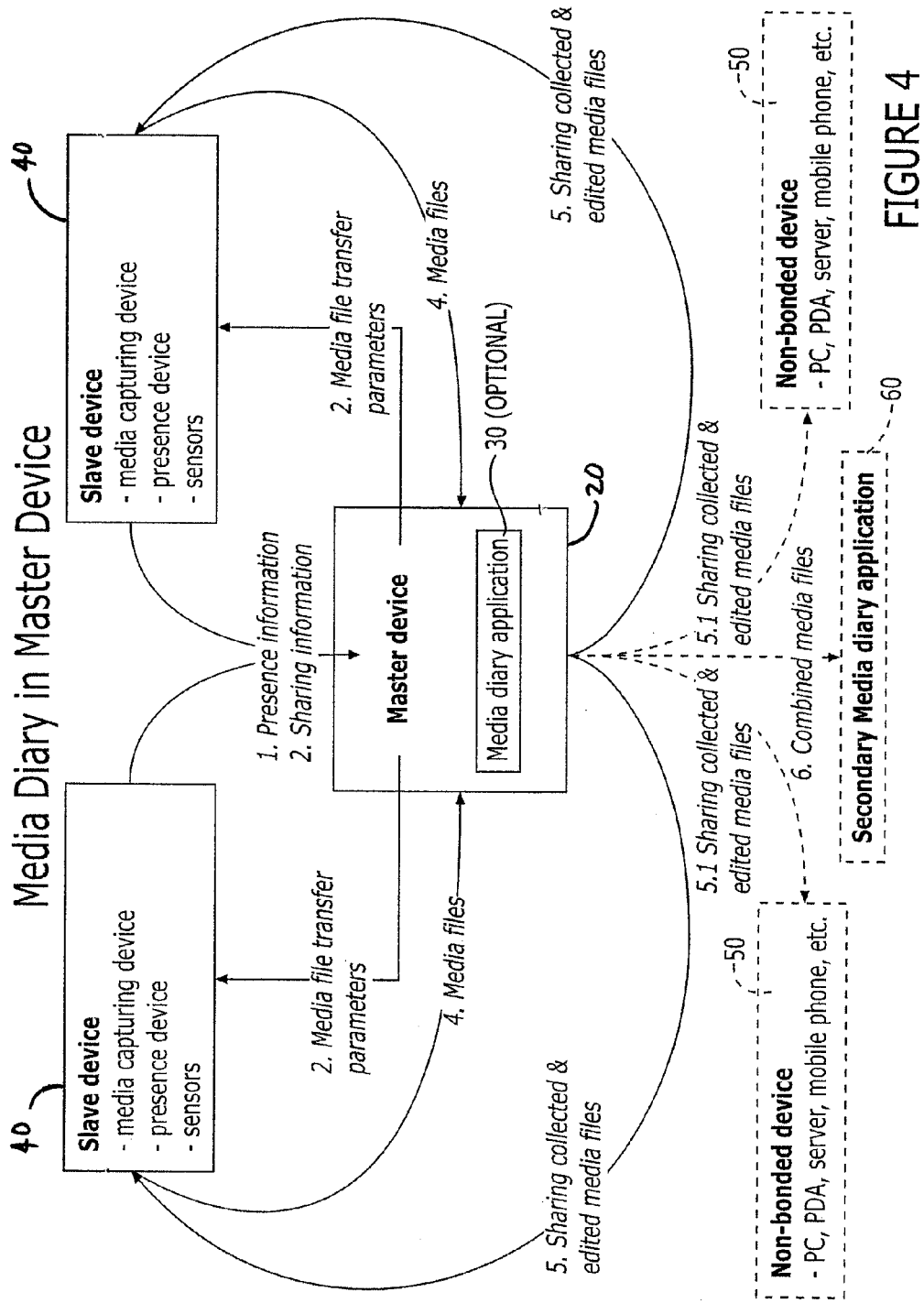

FIG. 4 is a block diagram of a media file sharing system and a method for collecting media files, in accordance with an embodiment of the present invention.

Figure 5:
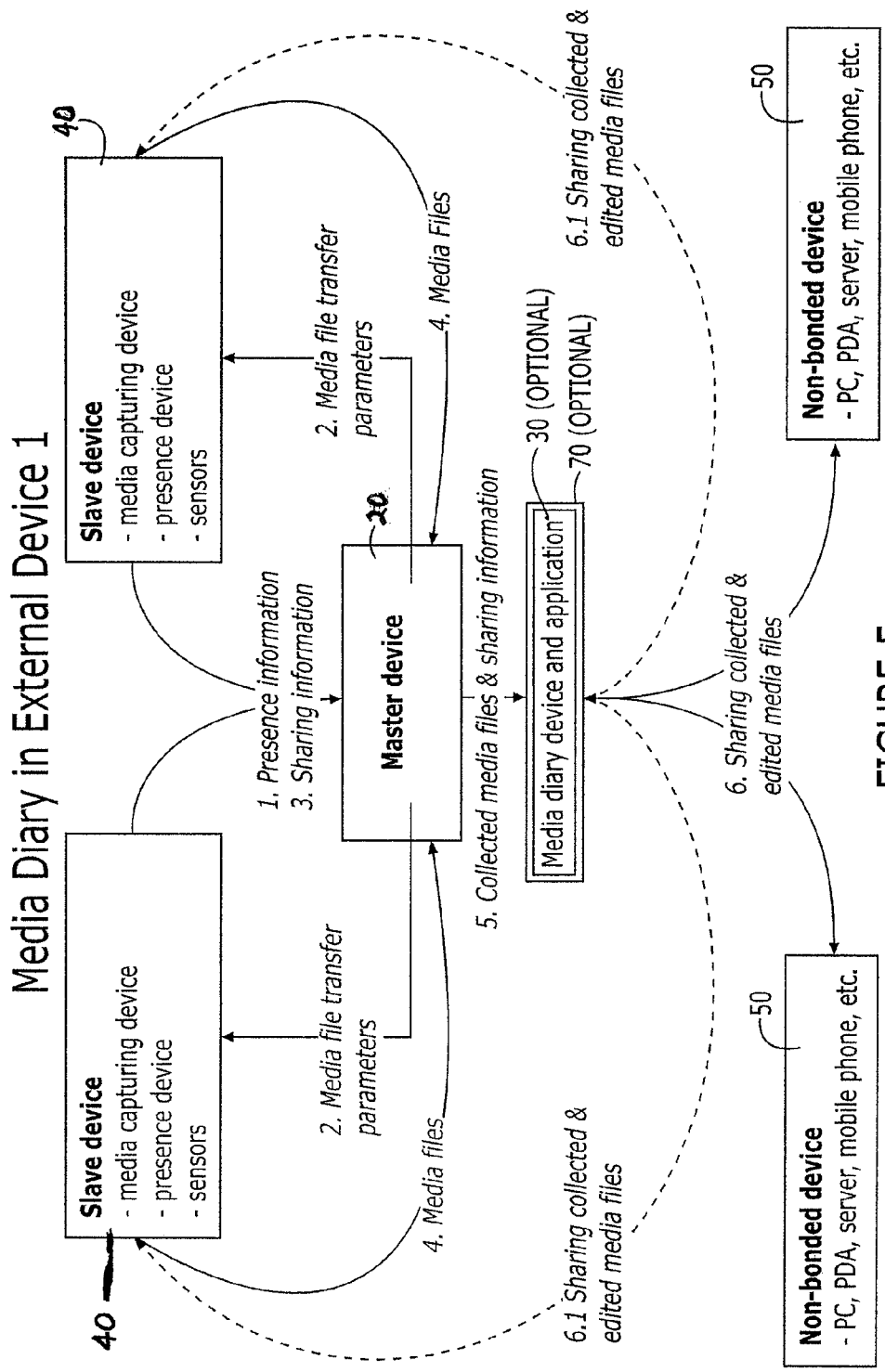

FIG. 5 is a block diagram of an alternate media file sharing system and a method for collecting media files, in accordance with an embodiment of the present invention.

Figure 6:
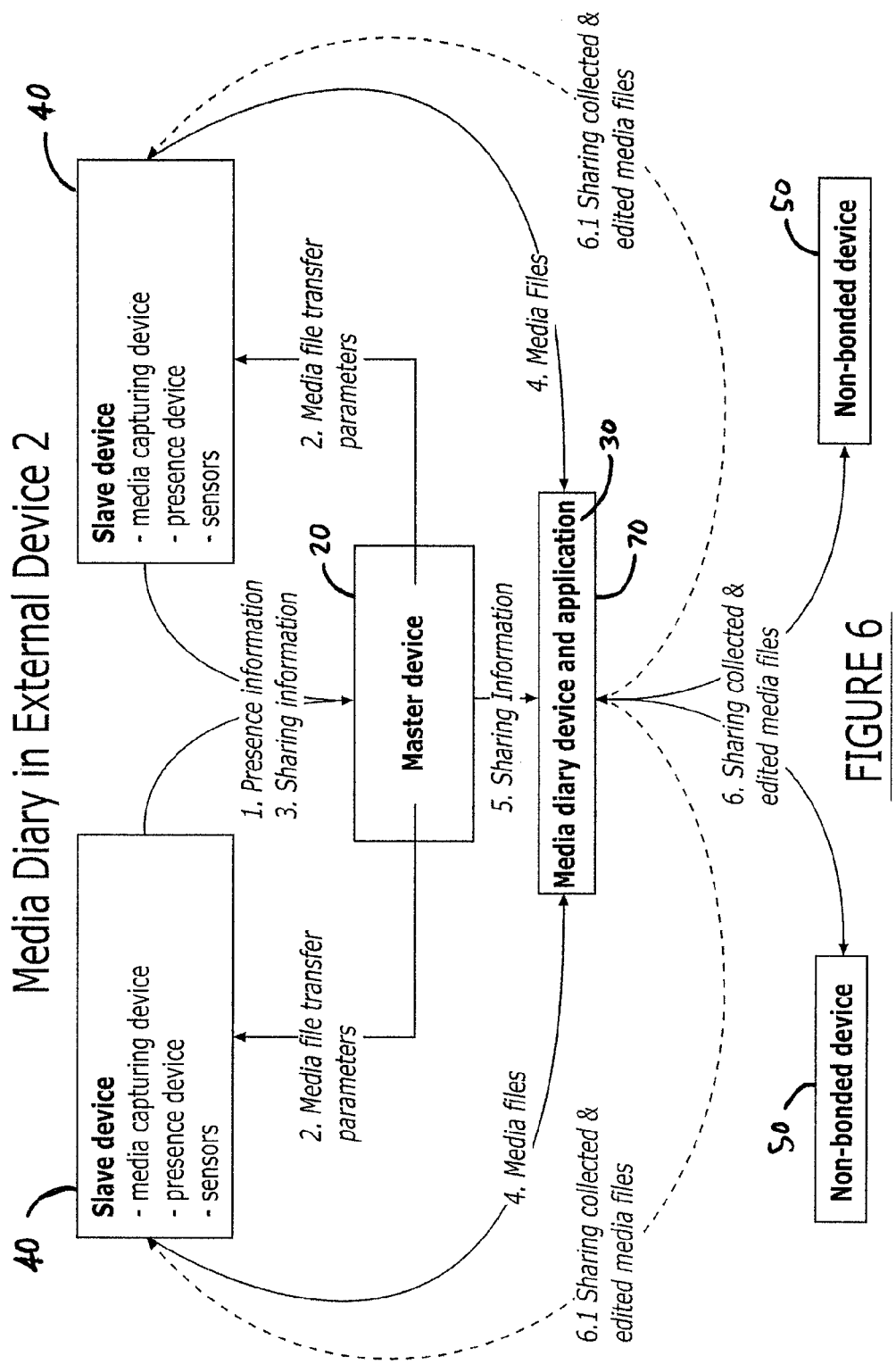

FIG. 6 is a block diagram of an alternate media file sharing system and a method for collecting media files, in accordance with an embodiment of the present invention.

Figure 7A:
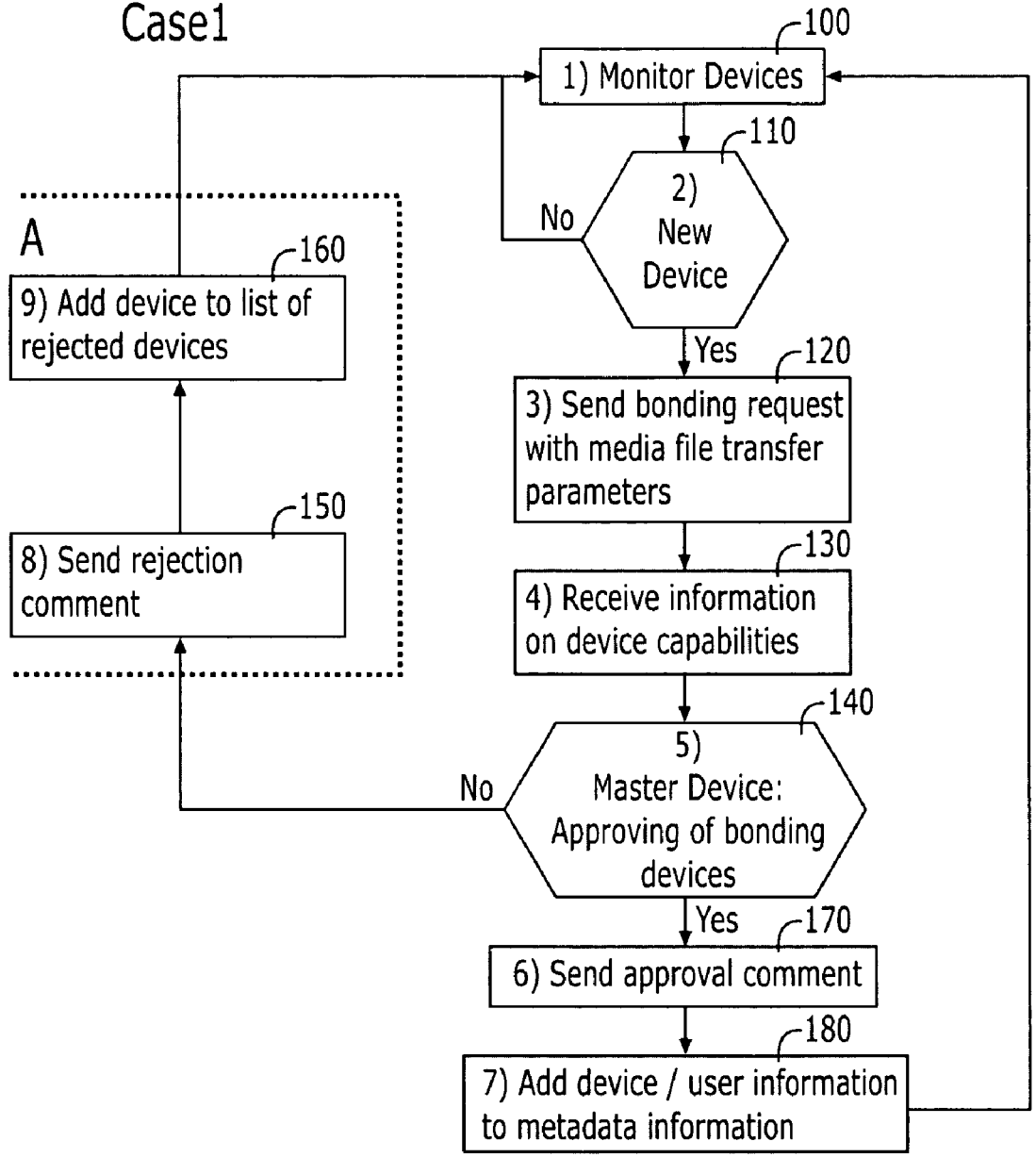
Figure 7B:
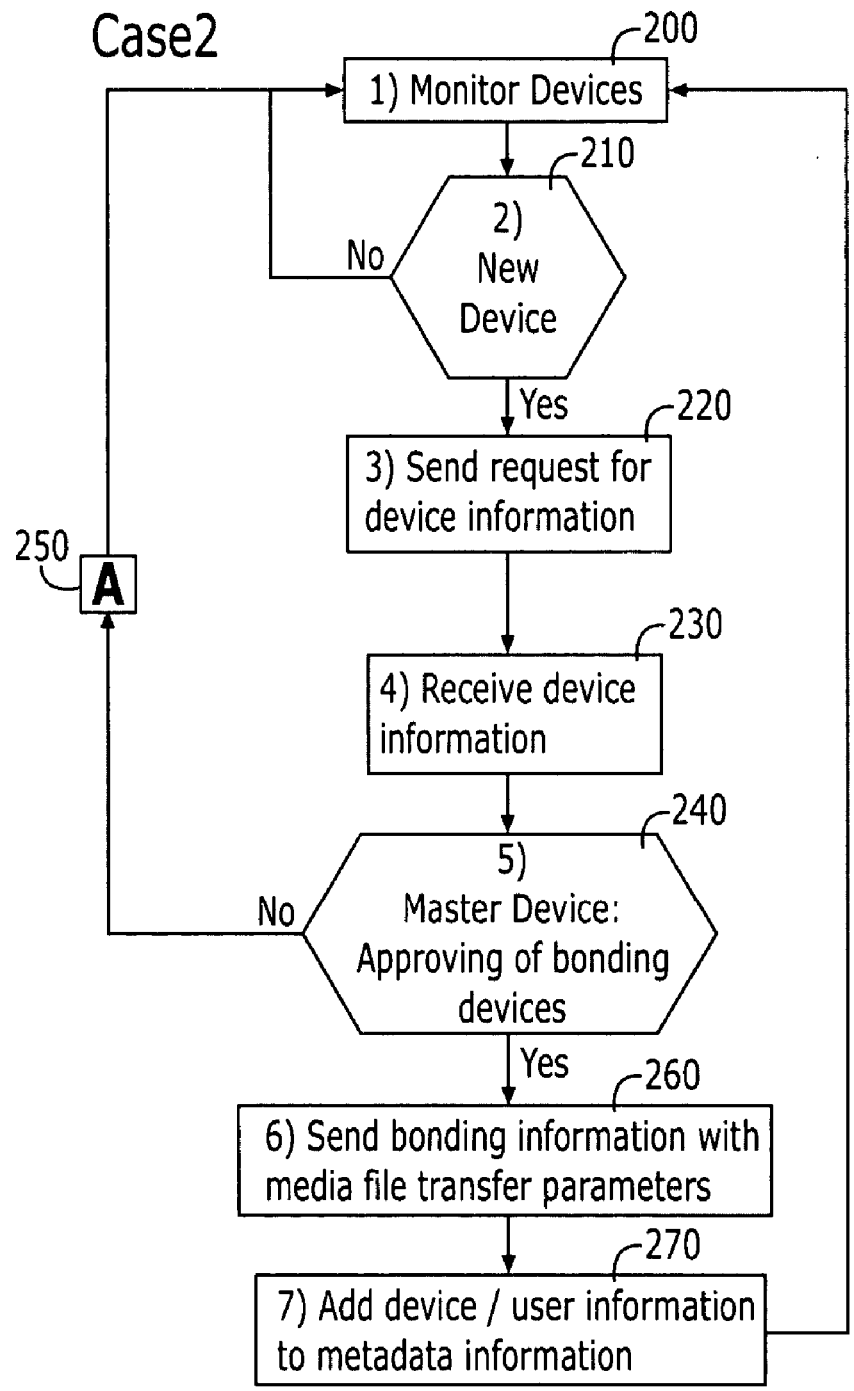
Figure 7C:
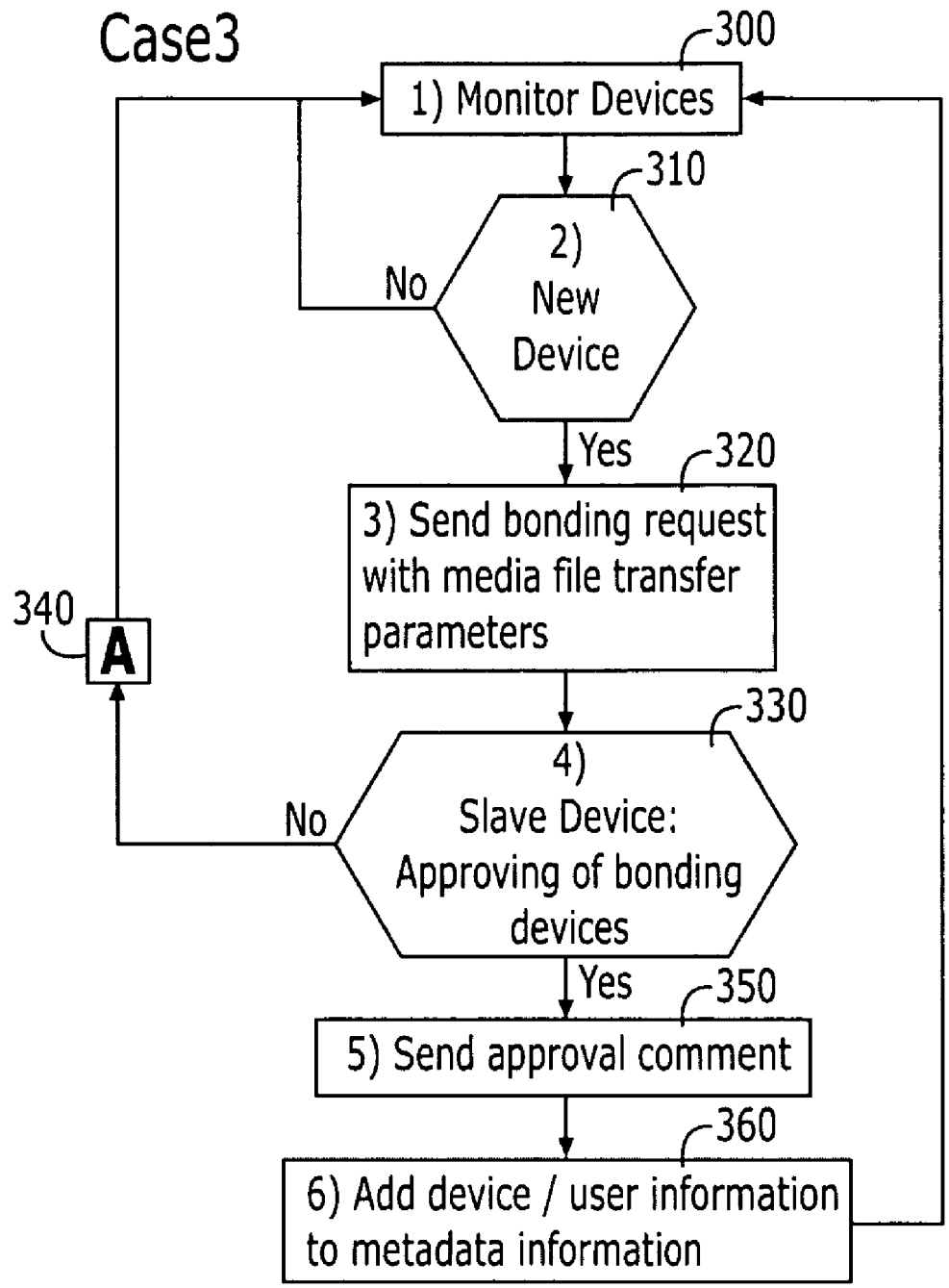

FIGS. 7A-7C are flow diagrams of alternate methods for bonding a master device and one or more slave devices and the collection of metadata, in accordance with an embodiment of the present invention.

Figure 8:
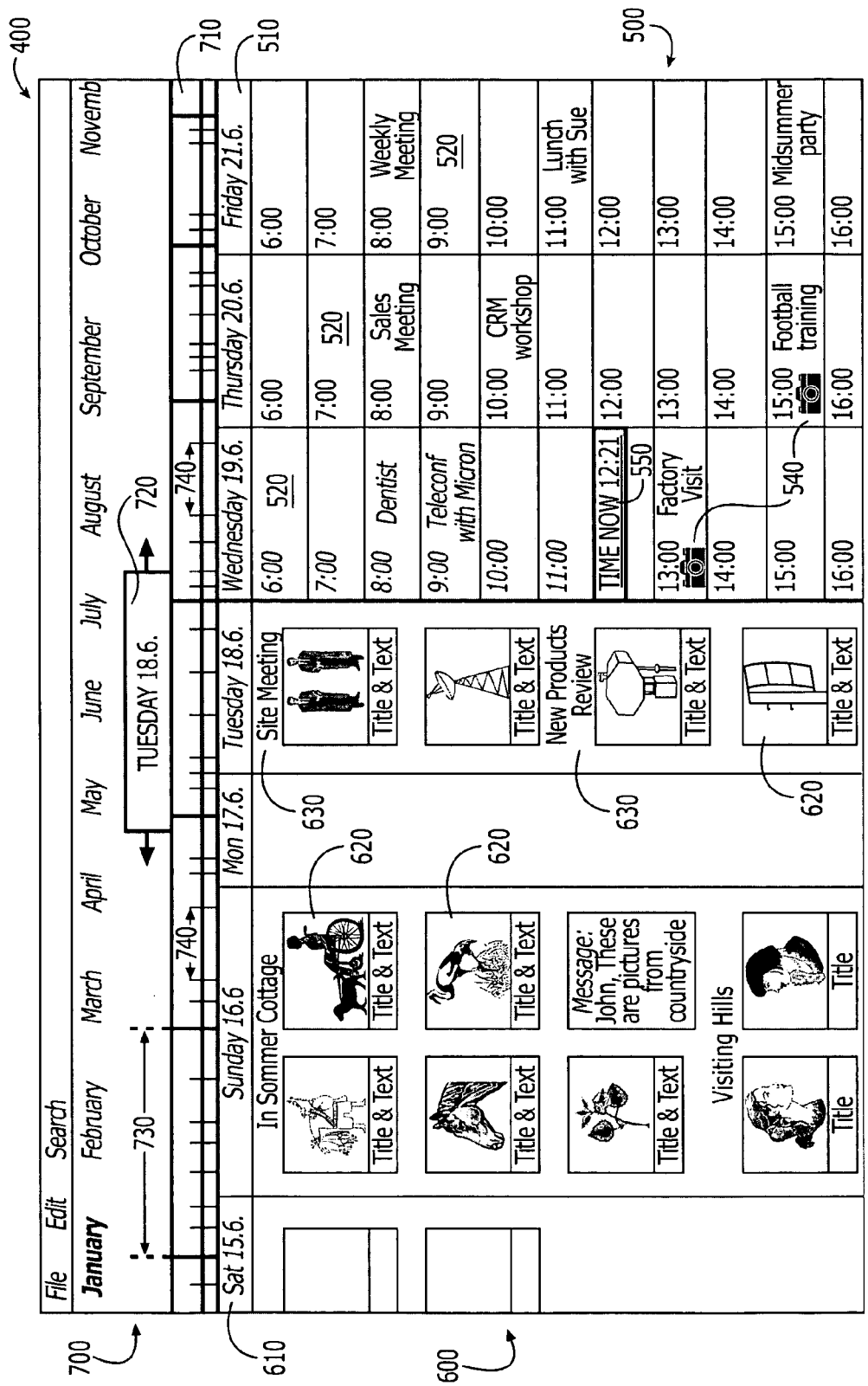

FIG. 8 is an illustration of an example of a media diary view as displayed by a media file collection application, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for digital devices, methods and systems for media file sharing. In one embodiment of the invention, a system for media file sharing is defined by a digital communication device, herein referred to as a master device, and one or more remote digital communication devices, such as media capturing devices, presence devices, sensors or the like, referred to as slave devices. While in many embodiments the slave devices will incorporate digital media capture means, such as image capture, video capture, audio capture or the like, it is not required for the purposes of the system of the present invention that the slave devices be equipped with a digital media capture device. While in many embodiments the master device will incorporate digital media capture, such as image capture, video capture, audio capture or the like, it is not required for the purposes of the system of the present invention that the master device be equipped with a digital media capture device.

The media file sharing system of the present invention is typically relevant to media events that warrant media capture. For example, a media event such as a birthday celebration, a wedding, an award ceremony or the like typically warrants media capture and the attendees at the event typically have a desire to possess the media files associated with the event. Rather than have the attendees capture the event in some digital form and then share files either manually or electronically at some point in time well after the event, the present invention provides for the media files to be immediately conveyed, from the slave devices to a master device, upon creation. The master device or an auxiliary device can then optionally assemble the files into an event collection and communicate the event collection back to the slave devices at or near the conclusion of the event. As such, the present invention serves to efficiently disseminate the media files associated with the event to all attendees who desire a comprehensive media file collection.

FIG. 1 provides for an exemplary illustration of the system for media file sharing, in accordance with an embodiment of the present invention. The system 10 will include a master device 20. In the illustrated embodiment the master device is a personal data assistant (PDA), however, the master device may be any other digital device capable of wireline or wireless communication, such as a cellular telephone, laptop computer, desktop computer, server computer, a digital camera equipped with wireless communication means or the like. As previously noted, the master device does not necessarily need to be equipped with conventional media capture means, such as a camera, camcorder, or audio recorder.

The master device is in wireless communication with a plurality of slave devices 40A-40E, many of which are equipped with digital capture devices, such as a digital camera 40A, digital camcorder 40B, camera equipped cellular telephone 40C, audio recording devices (not shown in FIG. 1) or the like. It is also possible for the slave devices to be digital devices that communicate wirelessly but are limited to capturing (i.e., storing) text files, such as laptop computer 40D, PDA 40E or the like. The slave devices may also be sensors that communicate sensor information wirelessly to the master device. Sensor information may be temperature, air pressure, weather, altitude, location information or the like. The slave devices may also be presence devices, i.e., devices that can inform of their presence at some location or area but are not necessarily capable of capturing or transmitting media files. In alternate embodiments, the master device and plurality of slave devices may be in conventional wireline communication.

The master device and the one or more slave devices will communicate via any standard form of wireless or wireline communication. For example, in the wireless scenario, the master device and slave device may communicate via Bluetooth®, Wi-Fi (802.11), any LPRF (low power radio frequency) network, wireless telecom network, wireless local area network, radio frequency identification (RFID) or the like. The master device determines if a particular communication service is available from a slave device. For example, in a Bluetooth® environment, at the time when a connection is made between Bluetooth® devices, an exchange of unique Bluetooth® identities, called global IDs, takes place. A device's global ID indicates its profile and functional capability. Upon matching of the device profile a connection is made and as the devices exchange data, the Bluetooth® transceiver chip hops back and forth among frequencies. In the Wi-Fi embodiment, Wi-Fi access is provided through access points, installed within a Wi-Fi location, that transmit an RF signal to Wi-Fi enabled devices that are within range of the access point, which is about 300 feet.

FIG. 2 provides a block diagram of the master device 20, in accordance with an embodiment of the present invention. The master device will include a data processor 22, a communication transceiver 24, typically a short-range transceiver, in communication with the data processor that is capable of monitoring an environment and receiving communications from one or more devices in the environment and a memory unit 26. The data processor will execute a bonding application 27 that provides for the bonding of the digital device to devices in the environment. Additionally the bonding application will provide for recordation of information related to the bonded devices and recordation of information related to the users of the bonded devices. The master device will additionally include a media transfer application 28 that is executed by the data processor and provides for media file transfer parameters that include instructions for creation of media file metadata information. The memory unit 26 will store the information recorded by the bonding application as bonded device metadata information.

The media transfer application may further provide for the media file transfer parameters to be communicated to the bonded devices. The media file transfer parameters may further include instructions for transmitting media files captured at the one or more bonded devices.

Optionally, the master device 20 may include a media file collection application 30 executed by the data processor 22 that organizes media files received from the bonded devices according to the media file metadata information. In alternate embodiments, the media file collection application may be implemented by auxiliary devices that are in communication with the master device. Also, optionally, the master device may include a metadata correlation application that combines the captured media file metadata information with the bonded device metadata information.

FIG. 3 provides for an exemplary illustration of an alternate system for media file sharing, in accordance with an embodiment of the present invention. The system 80 includes multiple digital devices 82A-82F each having an associated media capture device 84A-84F. The multiple digital devices will bond with one or more devices in the proximate area and share media files captured by the associated media capture device. For the sake of clarity the FIG. 3 embodiment only has arrows illustrating bonding between digital device 82A and the surrounding digital devices and 82E and the surrounding devices.

The digital devices in the FIG. 3 embodiment function in a similar fashion to the master device in the FIG. 1 embodiment. In that, the digital devices will include a data processor 22, a communication transceiver 24, typically a short-range transceiver, in communication with the data processor that is capable of monitoring an environment and receiving communications from one or more devices in the environment and a memory unit 26. The data processor will execute a bonding application 27 that provides for the bonding of the digital device to the other digital devices in the environment. Additionally the bonding application will provide for recordation of information related to the bonded devices and recordation of information related to the users of the bonded devices. The memory unit 26 will store the information recorded by the bonding application as bonded device metadata information.

Additionally, the digital device in the FIG. 3 system may include a display and a grouping application that executed by the data processor. The group application is executed by the processor and provides for display of a group mode menu structure that allows a device user to define a group event. Additionally, the group application may provide for the creation of group files that store media files associated with the event and the group application may provide for communication of the stored media files and media file metadata information to bonded devices. Alternatively the grouping application may automatically communicate, upon capture by the digital device, media files and media file metadata information to the bonded devices.

FIGS. 4-6 are block diagrams that detail the communication and media file sharing process between a master device and slave devices, in accordance with multiple embodiments of the present invention. The embodiments depicted in FIGS. 4-6 differ based on the device that implements an optional media file collection application and method for communicating the media files to the device that implements the optional collection application. It is noted that methods for bonding the slave devices to the master device are not depicted nor described in this section of the detailed disclosure. FIGS. 7A-7C, which will be discussed at length infra. relate to various methods for bonding slave devices to a master device.

FIG. 4 details an embodiment of the invention in which an optional media file collection application 30 is implemented within the master device 20. The master device 20 will monitor an area of interest to identify potential slave devices 40. Monitoring the area of interest will typically require the master device to receive signals (i.e. presence information) from potential slave devices that are within close proximity of the master device. Stage 1 of the FIG. 4 embodiment indicates the transmission of presence information from the potential slave devices to the master device.

Upon receipt of the identifying signals, the master device 20 will determine if the signals are coming from a new slave device, which has yet to be bonded to the media file collection application. If the device is identified as a new slave device, the master device will send out a signal asking for bonding of the potential slave device and informing the device of the media file transfer parameters and information transfer parameters. Stage 2 of the FIG. 4 embodiment indicates transmission of media file transfer parameters from the master device to the slave devices 40.

The media file transfer parameters and the information transfer parameters may be preconfigured in the master device and/or media file collection application or they may be defined by the user of the master device. Typically, the master device will send a bond request that may include, but is not limited to, the following bond request and media file transfer parameters:

1. Identification information, such as the address, of the master device, identification of the master device user or the like.
2. Predefined file transfer criteria, such as:
    automatically after the slave captures a media file.
    automatically when the slave device enters a certain network, (such as a Bluetooth network, wireline network or the like).
    automatically at predetermined time intervals.
    manually at the directive of the user of the slave device.
    manually at the request of the master device.
3. Transmission link for transferring media files; such as Bluetooth, WLAN, wireless telecom, wireline network etc.
4. Transmission format to be used in communicating the media files; such as multimedia messaging service (MMS), file transmission, etc.
5. Predefined bond duration criteria, such as:
    continuous, based on the slave device remaining within a specified proximity of the master device.
    a predefined time period.
6. Transfer destination and address of the destination device, such as:
    to the master device.
    to other device(s).
7. Acceptable format of the media file, such as:
    JPEG, TIF, MPEG-2, MPEG-4 or the like.
8. Metadata instructions, such as:
    metadata information to be included and/or excluded.
    identification information of the event.
9. Transmission information for sensor devices, such as:
    transmit criteria (i.e. define when to transmit).
    transmission link.
    transmission destination.

The listing of media file transfer parameters is by way of example only and is not intended to be an exhaustive listing. Other media file transfer parameters may be defined within the master device and/or media file collection application, as dictated by the master device and/or media file collection application configuration or the user of the master device and/or media file collection application. Additionally, the file transfer parameters may define the slave devices designated to receive captured media files or a subsequently assembled collection of media files. Also, the file transfer parameters may define requirements that the captured media files or a collection of media files be transmitted to a intermediary device, which may implement a media file collection application or some other form of a media file management application.

Once the bond request and media file transfer parameters have been communicated to potential slave devices 40, the potential slave device will signal the master device and the master device will determine if the potential slave device is approved for bonding. See FIG. 7 and the discussion related to FIG. 7 for further details on alternate methods for bonding.

Once the master device and the slave device have completed the bond process, the slave devices 40 will transmit information to the master device related to how collected media files will be shared. For example, the slave device may desire that the collection of media files be sent to the slave device itself or to a secondary non-bonded device. In this regard, the slave device will send to the master device the address of the receiving device (i.e., the device that will receive the collection of media files). In addition, the bonded slave device may send information to the master device related to collection editing parameters, i.e., requesting that certain media files be omitted or augmented before the master device communicates the collection to the slave device or to the slave-device designated non-bonded device. In addition, the information transmitted from the slave device to the master may include when to share the files (such as at certain time), or by request, in which file format, or via which network. Stage 3 of the FIG. 4 embodiment indicates the communication of this sharing information from the slave devices to the master device.

Once the master device 20 has bonded with one or more slave devices and the sharing information has been exchanged, the master device will receive media file communications from the bonded slave devices in accordance with the file transfer parameters. The media files communicated from the slave device to the master device may include image files, video files, audio files, text documents, multimedia presentations and the like. Stage 4 of the FIG. 4 embodiment indicates the communication of media files from the slave device to the master device.

Upon receipt of the media files, the master device 20 may automatically or by master device user request communicate the media file to the optional media file collection application being implemented on the master device. The optional media file collection application will correlate the media file metadata information with the slave device metadata information and, in certain embodiments, with calendar event metadata information. The correlated metadata will provide for searchable data in the media file collection application database, thus, allowing for the media files to be readily searched based on information associated with the file, the slave device from which it was transmitted and/or the calendar event associated with the file.

In certain embodiments, once the master device has collected media files from multiple slave devices and transmitted the collected media files to the optional media file collection application, the media file collection application will assemble a comprehensive media file collection related to the event that includes all, or a portion of, the media files associated with the event. In this regard, the user of the optional media file collection application may edit the media files to augment the media files or eliminate certain media files from the comprehensive media file collection. The media file collection application may be configured to automatically or by request communicate the comprehensive media file collection to one of the bonded slave devices, a portion of the bonded slave devices or all of the bonded slave devices. Determination of which bonded devices receive the collection of media files may be determined by the sharing information transmitted from the bonded slave device to the master device, as detailed in Stage 3 discussion above. Stage 5 of the FIG. 4 embodiment indicates the process of sharing (i.e., communicating) the collected and edited media files from the master device to the slave devices.

Alternatively, the media file collection may be communicated to other non-bonded devices 50 based on configuration of the master device, master device user request or as requested by a bonded slave device per Stage 3 discussed above. Stage 5.1 of the FIG. 4 embodiment indicates the process of sharing (i.e., communicating) the collected and edited media files to other non-bonded devices, such as a PC, PDA, server, mobile telephone, etc. Additionally, the media file collection may be communicated to another secondary media file collection application 60 that is typically implemented on an external device. Stage 6 of the FIG. 4 embodiment indicates the communication of the combined media files from the master device to a secondary media application.

FIG. 5 details an embodiment of the invention in which an optional media file collection application 30 is implemented in an intermediary device 70 external from the master device 20. Stages 1-4 of the FIG. 5 embodiment are identical to Stages 1-4 of the FIG. 4 embodiment. The master device 20 will monitor an area of interest to identify potential slave devices 40. Stage 1 of the FIG. 5 embodiment indicates the transmission of presence information from the potential slave devices to the master device.

Upon receipt of the identifying signals and determination of the slave device 40 being a "new" signaling slave device, the master device 20 will send out a signal asking for bonding of the potential slave device and informing the device of the media file transfer parameters and information transfer parameters. Stage 2 of the FIG. 5 embodiment indicates transmission of media file transfer parameters from the master device to the slave devices.

Once the bond request and media file transfer parameters have been communicated to potential slave devices 40, the potential slave device will signal the master device and the master device will determine if the potential slave device is approved for bonding. See FIG. 7 and the discussion related to FIG. 7 for further details on alternate methods for bonding.

Once the master device and the slave device have completed the bond process, the slave devices 40 will transmit information to the master device related to how collected media files will be shared. For example, the slave device may desire that the collection of media files be sent to the slave device itself or to a secondary non-bonded device. In this regard, the slave device will send to the master device the address of the receiving device (i.e., the device that will receive the collection of media files). In addition, the bonded slave device may send information to the master device related to collection editing parameters, i.e., requesting that certain media files be omitted or augmented before the master device communicates the collection to the slave device or to the slave-device designated non-bonded device. In addition, the information transmitted from the slave device to the master may include when to share the files (such as at certain time), or by request, in which file format, or via which network. Stage 3 of the FIG. 3 embodiment indicates the communication of sharing information from the slave devices to the master device.

Once the master device 20 has bonded with one or more slave devices and the sharing information has been exchanged, the master device will receive media file communications from the bonded slave devices in accordance with the file transfer parameters. Stage 4 of the FIG. 5 embodiment indicates the communication of media files from the slave device to the master device.

Upon receipt of the media files, the master device 40 may automatically or by master device user request communicate the media file to the optional media file collection application 30 being implemented on an intermediary device 70 external from the master device. Depending on configuration, the master device may individually, upon receipt, communicate media files to the intermediary device, or the master device may store and communicate, at once, all of the media files received during a bond session or the master device may accumulate a predetermined quantity (either number or file size) of media files and then communicate them to the optional media file collection application. In addition, the master device will communicate to the intermediary device information related to how the collected media files will be further communicated (i.e., the instructions received from the slave devices at Stage 3). Stage 5 of the FIG. 5 embodiment indicates the communication of media files and sharing information from the master device to the intermediary device implementing the media file collection application.

The external media file collection application will correlate the media file metadata information with the slave device metadata information and, in certain embodiments, with calendar event metadata information. The correlated metadata will provide for searchable data in the media file collection application database, thus, allowing for the media files to be readily searched based on information associated with the file, the slave device from which it was transmitted and/or the calendar event associated with the file.

Similar to the embodiment depicted in FIG. 4 and described above, once the external media file collection application has collected media files, the media file collection application will assemble a comprehensive media file collection related to the event that includes all, or a portion of, the media files associated with the event. In this regard, the user of media file collection application can edit the media files to augment the media files or eliminate certain media files from the comprehensive media file collection. The optional media file collection application may be configured to automatically or by request communicate the comprehensive media file collection to one of the bonded slave devices, a portion of the bonded slave devices or all of the bonded slave devices according to the sharing information from Stage 3. Stage 6.1 of the FIG. 5 embodiment indicates the process of sharing (i.e., communicating) the collected and edited media files from the master device to the slave devices.

Alternatively, the media file collection may be communicated to other non-bonded devices 50 based on configuration of the master device, master device user request or as requested by a bonded slave device. Stage 6.0 of the FIG. 5 embodiment indicates the process of sharing (i.e., communicating) the collected and edited media files to other non-bonded devices, such as a PC, PDA, server, mobile telephone, etc.

FIG. 6 details another alternate embodiment of the invention in which an optional media file collection application 30 is implemented in an intermediary device 70 external from the master device 20. The FIG. 6 embodiment differs from the FIG. 5 embodiment, in that, the slaves devices are instructed to communicate the media files directly to the external device implementing the media file collection application, as opposed to communicating the media to the master device. Stages 1-3 of the FIG. 6 embodiment are identical to Stages 1-2 of the FIG. 4 and FIG. 5 embodiments. The master device 20 will monitor an area of interest to identify potential slave devices 40. Stage 1 of the FIG. 6 embodiment indicates the transmission of presence information from the potential slave devices to the master device.

Upon receipt of the identifying signals and determination of the slave device 40 being a "new" signaling slave device, the master device 20 will send out a signal asking for bonding of the potential slave device and informing the device of the media file transfer parameters and information transfer parameters. Stage 2 of the FIG. 6 embodiment indicates transmission of media file transfer parameters from the master device to the slave devices.

Once the bond request and media file transfer parameters have been communicated to potential slave devices 40, the potential slave device will signal the master device and the master device will determine if the potential slave device is approved for bonding. See FIG. 7 and the discussion related to FIG. 7 for further details on alternate methods for bonding.

Once the master device and the slave device have completed the bond process, the slave devices 40 will transmit information to the master device related to how collected media files will be shared. For example, the slave device may desire that the collection of media files be sent to the slave device itself or to a secondary non-bonded device. In this regard, the slave device will send to the master device the address of the receiving device (i.e., the device that will receive the collection of media files). In addition, the bonded slave device may send information to the master device related to collection editing parameters, i.e., requesting that certain media files be omitted or augmented before the master device communicates the collection to the slave device or to the slave-device designated non-bonded device. In addition, the information transmitted from the slave device to the master may include when to share the files (such as at certain time), or by request, in which file format, or via which network. Stage 3 of the FIG. 6 embodiment indicates the communication of sharing information from the slave devices to the master device. Alternatively the sharing information may be directly communicated to an intermediary device 70, which implements the media file collection application.

Once the master device 20 has bonded with one or more slave devices and the sharing information has been exchanged, an intermediary device 70, which implements the optional media file collection application 30, will receive media file communications from the bonded slave devices in accordance with the file transfer parameters. In this scenario, the master device has instructed the slave devices, via the file transfer parameters, to communicate the media files to the intermediary device. Stage 4 of the FIG. 6 embodiment indicates the communication of media files from the slave devices to the intermediary device.

In addition, the master device 20 will communicate to the intermediary device information related to how the collected media files will be further communicated (i.e., the instructions received from the slave devices). Stage 5 of the FIG. 6 embodiment indicates the communication of sharing information from the master device to the intermediary device implementing the external media file collection application.

The external media file collection application will correlate the media file metadata information with the slave device metadata information and, in certain embodiments, with calendar event metadata information. The correlated metadata will provide for searchable data in the media file collection application database, thus, allowing for the media files to be readily searched based on information associated with the file, the slave device from which it was transmitted and/or the calendar event associated with the file.

Similar to the embodiment depicted in FIG. 4 and described above, once the external media file collection application has collected media files, the media file collection application will assemble a comprehensive media file collection related to the event that includes all, or a portion of, the media files associated with the event. In this regard, the user of media file collection application can edit the media files to augment the media files or eliminate certain media files from the comprehensive media file collection. The media file collection application may be configured to automatically or by request communicate the comprehensive media file collection to one of the bonded slave devices, a portion of the bonded slave devices or all of the bonded slave devices. Stage 6.1 of the FIG. 6 embodiment indicates the process of sharing (i.e., communicating) the collected and edited media files from the master device to the slave devices according to the sharing information of Stage 3.

Alternatively, the media file collection may be communicated to other non-bonded devices 50 based on configuration of the master device, master device user request or as requested by a bonded slave device at Stage 3. Stage 6.0 of the FIG. 6 embodiment indicates the process of sharing (i.e., communicating) the collected and edited media files to other non-bonded devices, such as a PC, PDA, server, mobile telephone, etc.

FIGS. 7A-7C are flow diagrams of various methods for bonding a master device to one or more slave devices, in accordance with embodiments of the present invention.

The bonding method of FIG. 7A begins at step 100, at which the master device monitors the immediate environment for potential new slave devices. Monitoring the immediate environment involves the master device receiving presence information that has been transmitted by one or more slave devices in the immediate vicinity/environment. Digital signal transmission may be in accordance with any chosen wireless communication medium, such as short-range radio network (i.e., Bluetooth®), WLAN, RFID, wireless telecom network or the like. The area of interest will typically be defined by the range of the chosen wireless communication medium.

At step 110, once the master device receives a presence signal, the master device determines if the signaling device is a new device. The signaling device may be a device that was previously accepted (i.e., bonded) or a device that was previously rejected as not been suitable for binding. In either of these instances the signaling device is considered to be not new. The master device checks both the accept and the reject storage lists to determine if the signaling device is new. If the device is determined to not be new, the flow returns to step 100 for further monitoring of the area.

If the signaling device is determined to be a new device then, at step 120, the master device will send a bond request and media file transfer parameters to the potential slave device. Examples of media file parameters are provided above in the detailed description related to FIG. 4. At step 130, once the potential slave device receives the bond request and media file transfer parameters, the potential slave device will respond with information related the bonding capabilities of the potential slave device.

At step 140, the master device will analyze the bonding capabilities of the potential slave device to determine the whether the potential slave device fulfills the requirements for media file transfer (i.e., bonding). Bonding approval may be based on the slave device's capability to provide certain types of media files and the slave device's network and transmission capabilities. If the slave device does not fulfill the requirements then at step 150, a rejection notice is communicated to the potential slave device alerting the user of the potential slave device that bonding of the devices has been rejected. In addition, at step 160, the master device adds the rejected potential slave device to the stored list of "monitored slave devices" and identifies the device with a reject attribute.

If the master device approves of the bonding of the potential slave device the, at step 170, the information related to the approved slave device is added to the stored list of "monitored slave devices" and identifies the device as being approved for bonding. The related information may include the device type, device technical features, device user identification, duration of bonding period and the like. After the device has been approved, at step 180, the slave device information and slave-user information are correlated/combined with event-specific metadata information to create combined slave device/event metadata. The routine then returns to step 100, for further monitoring of the immediate environment.

Additionally, once the slave device is bonded to the master device it may communicate information to the master device concerning how, when and where the master device should communicate the comprehensive collection of media files that it assembles from all of the bonded devices. For example, the slave device may desire that the collection of media files be sent to the slave device itself, as well as, to a secondary non-bonded device. In addition, the bonded slave device may send information to the master device related to collection editing parameters, i.e., requesting that certain media files be omitted or augmented before the master device communicates the collection to the slave device or to the slave-device designated non-bonded device.

In alternate, embodiments of the bonding process described in FIG. 7A it may be possible for the potential slave devices to evaluate the request from the master device for bonding, assess bonding capabilities and to communicate the results of the evaluation to the master device. Additionally, it may possible for the potential slave device to reject the bonding request, if the potential slave device does not desire the collection of media files that will be assembled and disseminated by the master device or an intermediary device.

An alternate method for bonding is described by the flow diagram of FIG. 7B, in accordance with an embodiment of the present invention. At step 200, the master device monitors the immediate environment for potential new slave devices. Monitoring the immediate environment involves the master device receiving presence information that has been transmitted by one or more slave devices in the immediate vicinity/environment.

At step 210, once the master device receives a presence signal, the master device determines if the signaling device is a new device. The signaling device may be a device that was previously accepted (i.e., bonded) or a device that was previously rejected as not been suitable for binding. In either of these instances the signaling device is considered to be not new. The master device checks both the accept and the reject storage lists to determine if the signaling device is new. If the device is determined to not be new, the flow returns to step 200 for further monitoring of the area.

If the signaling device is determined to be a new device then, at step 220, the master device will send a request to the potential slave device asking for the potential slave device's bonding capabilities. At step 230, the potential slave device will respond with a communication to the master device informing the master device of their bond capabilities.

At step 240, once the master device receives the bond capability information from the potential slave device, the master device analyzes the response to determine if the potential slave device fulfills the requirements for media file transfer. If the slave device does not fulfill the requirements then at step 250, a rejection notice is communicated to the potential slave device alerting the user of the potential slave device that bonding of the devices has been rejected. In addition, the master device adds the rejected potential slave device to the stored list of "monitored slave devices" and identifies the device with a reject attribute.

If the master device approves of the bonding of the potential slave device the, at step 270, the master device communicates the bonding information and the media file transfer parameters to the slave device and the approved slave device is added to the stored list of "monitored slave devices".

After the device has been approved, at step 280, the slave device and slave-user information are correlated/combined with event-specific metadata information to create combined slave device/event metadata. The routine then returns to step 200, for further monitoring of the immediate environment.

In alternate, embodiments of the bonding process described in FIG. 7B it may be possible for the potential slave device to reject the bonding request, if the potential slave device does not desire the collection of media files that will be assembled and disseminated by the master device or an intermediary device.

Another method for bonding is described by the flow diagram of FIG. 7C, in accordance with an embodiment of the present invention. At step 300, the master device monitors the immediate environment for potential new slave devices. Monitoring the immediate environment involves the master device receiving presence information that has been transmitted by one or more slave devices in the immediate vicinity/environment.

At step 310, once the master device receives a presence signal, the master device determines if the signaling device is a new device. The signaling device may be a device that was previously accepted (i.e., bonded) or a device that was previously rejected as not been suitable for binding. In either of these instances the signaling device is considered to be not new. The master device checks both the accept and the reject storage lists to determine if the signaling device is new. If the device is determined to not be new, the flow returns to step 300 for further monitoring of the area.

If the signaling device is determined to be a new device then, at step 320, the master device will send a bond request and media file transfer parameters to the potential slave device. At step 330, once the potential slave device receives the bond request and media file transfer parameters, the potential slave device will analyze the request and parameters to determine if the slave device fulfills the requirements for bonding.

If the slave device does not fulfill the requirements then at step 340, a rejection notice is communicated to the master device alerting the user of the master device that bonding of the potential slave device has been rejected. In addition, the master device adds the rejected potential slave device to the stored list of "monitored slave devices" and identifies the device with a reject attribute.

If the slave device approves of the bonding then, at step 350, the slave device communicates an approval notice to the master device and the master device adds the approved slave device to the stored list of "monitored slave devices and identifies the device in the list with an approval attribute.

After the device has been approved, at step 360, the slave device and slave-user information are correlated/combined with event-specific metadata information to create combined slave device/event metadata. The routine then returns to step 300, for further monitoring of the immediate environment.

Additionally, once the slave device is bonded to the master device it may communicate information to the master device concerning how, when and where the master device should communicate the comprehensive collection of media files that it assembles from all of the bonded devices. For example, the slave device may desire that the collection of media files be sent to the slave device itself, as well as, to a secondary non-bonded device. In addition, the bonded slave device may send information to the master device related to collection editing parameters, i.e., requesting that certain media files be omitted or augmented before the master device communicates the collection to the slave device or to the slave-device designated non-bonded device.

In alternate embodiments of the bonding process described in FIG. 7C it may be possible for the potential slave device to reject the bonding request, if the potential slave device does not desire the collection of media files that will be assembled and disseminated by the master device or an intermediary device.

The invention is also embodied in a method for correlating and/or compiling metadata information of media files, bonded slave devices and calendar events. Slave devices may include a media capture device, a presence device or a sensor device.

Examples of media capture devices include, digital cameras, cellular or mobile telephones equipped with cameras, digital camcorders, digital audio recording devices and the like. The media capture devices are capable of creating metadata information and including the created metadata in the media file. The creation of metadata by the capturing device may be automatic, upon creation of the media file, or the metadata may be inputted manually by the device user. Examples of metadata information created by a capturing device include, the type of media capture device, the technical features of the media capture device, identification of the user of the media capture device, title of the media file, event related to the media file, date and/or time the media file was created, location of the media capture event.

Presence devices are devices without media capture capability or the ability to transfer/communicate media files wirelessly. Presence devices inform the master device of their presence in the immediate environment for inclusion in the master device's presence listing and inform the master device of a destination address for the collected media files. Examples of information transmitted by the presence device include device user identification, event information and information related to destination addresses for communication the collected media files. This information may be referred to as the metadata information associated with the presence device. Alternately, the presence device may inform the master device that they desire not to be included on the master device's presence list. Examples of presence devices include mobile or cellular telephones, PDAs or the like.

Sensors are devices that monitor the immediate environment, such as thermometers, movement sensors, location sensors or the like. As such, examples of sensor communicated information include, weather, temperature, air pressure, location and the like. This information may be referred to as the metadata information associated with the sensor devices.

As a means of defining the required metadata information, the master device may communicate to the slave devices, in particular the media capturing slave device, instructions requesting what information is to required to be collected as metadata in the media files. Typically, this communication will be in unison with communication from the master device to the slave device of media file transfer parameters. The creation of the instructions by the master device may be automatic or manual (i.e., requiring user input). Examples of master device requested information includes, the event name, the time and date of the media file capture, the location of the event, and the like.

The media capture devices will create (i.e., capture) media events and metadata will either be automatically created at the time of capture or inputted manually by the user of the device. Prior to transmitting the media file to the master device or to an intermediary device additional metadata type information may be added. Examples of additional metadata type information include metadata previously communicated by the master device and information related to destination address (es) for the collected media files (i.e., a request to communicate the collected media files to a non-bonded device).

Once the master device or the intermediary device receive the media files and associated metadata the master device may add to the received media file metadata information additional event specific metadata such as, event title, data and time of event, sensor information, list of bonded devices at the event, time of receipt and/or transmission of the media file, information related to further communication of the collected media files and the like.

The master device or the intermediary device may then communicate the media files with associated metadata to an optional media file collection application. As discussed above the media file collection application may be implemented on the master device or it may be implemented on an intermediary device that is external to the master device. The optional media file collection application will correlate metadata of all the media files that it receives during the bonding period. In addition, the media file collection application may correlate the metadata of the media files with associated calendar event metadata. Once correlated, the media file collection application will combine and store all of the event specific media files and associated metadata items in a comprehensive collection of media files and master metadata file. Additionally, the media file collection application may add additional metadata information to media file metadata and/or the master metadata file, such as a bookmark, an annotation, comments, etc. For a more detailed description of a media file collection application implementing bookmarking and annotations, see co-pending U.S. patent application Ser. No. 10/715,093, filed on Nov. 17, 2003 in the name of inventors Myka et al. entitled "Bookmarking and Annotating in a Media Diary Application". That application is herein incorporated by reference as if set forth fully herein.

In order to gain a further understanding of the present and, specifically, the media file sharing system implemented in conjunction with a media file collection application, the following detailed description provides for an example of a media file collection application, in accordance with an embodiment of the present invention. The media file collection application herein disclosed, which is referred to as the media diary application, is by way of example only. Other media file collection application that possess the capability to collect and organize media files are also contemplated and are within the inventive concepts herein disclosed.

The exemplary media diary application herein disclosed will associate media files with a moment of time, period of time or event, so that the user can manage media files according to a moment of time, period of time or event. For the sake of brevity and so as to not confuse the reader, the term of "period of time" is used herein to refer to both a time range, as well as, a particular moment in time. Typically, the period of time will be a specific date associated with a date that the media file was created or intended for. For example, if the media file is an image or video file of a birthday party, the media application may categorize and store the file according to the date of the birthday party and/or the individual having the birthday. For a complete description of the media diary application see co-pending U.S. patent application Ser. No. 10/715,093, filed on Nov. 17, 2003, in the name of inventor Myka et al., and assigned to the same assignee as the present invention. That application is herein incorporated by reference as if set forth fully herein.

The exemplary media diary application described herein, as well as all other media file collection applications that posses the capability to correlate media file metadata and slave device metadata, may be implemented and executed on any electronic communication device that incorporates a display, such as a portable computer, cellular telephone, personal data assistant (PDA), digital camera, digital camcorder, e-book device, digital audio player or the like. In addition the media file collection application may be implemented on electronic devices that are connected to an external display, such as a set-top box (STB), personal video recorder (PVR), digital video recorder (DVR) or the like. The digital device that executes the media file collection application will be capable of any type of wireless or wireline network communication, such as wireless telecom, short range radio network, Bluetooth®, Wireless Local Area Network (WLAN), Radio Frequency Identification (RFID), Internet Protocol Data Casting (IPDC), Digital Video Broadcasting (DVB), Infrared Data Association (IrDa), Internet or the like.

In accordance with an embodiment of the present invention, the media file collection application will be embodied by a computer-readable storage medium having computer-readable program instructions stored in the medium. The storage medium will typically be a memory device, such as flash ROM memory, HDD or the like. The programming instructions may be written in a standard computer programming language, such as C++, Java or the like. Upon execution by a processing unit as described below, the program instructions will implement the various functions of the media file collection application as described below. While the instructions may be modules, objects or the like that communicate with one another, the first, second and optional third instructions need not be discrete or separable portions of the program instructions and may be interspersed throughout if so desired.

FIG. 8 provides examples of displayed views, commonly referred to as a screen shot that a user of the media diary application will access and interface with when using the media diary application. FIG. 8 illustrates an example of a media diary view 400, which combines a calendar view 500, a media view 600 and a timeline view 700. As depicted, the calendar view 500 is displayed on the right-hand side of the digital device's display, the media view 600 is displayed on the left-hand side of the display and the timeline view features are displayed above both the calendar view and the media view. Horizontal scrolling within the media diary application may provide for the display of a full media view and corresponding timeline view (i.e., absent a calendar view) or for the display of a full calendar view and corresponding timeline (i.e., absent a media view). The dates of interest will dictate whether the user views a calendar view, typically future dates, a media view, typically prior dates or a combined media view and calendar view, typically future dates and prior dates in close proximity to the current date.

The calendar view 500 portion of the overall media diary view 400 provides for the entry of calendar events or reminders and provides the user with a daily planner application, in accordance with an embodiment of the present invention. It is noted that the calendar view herein depicted and described is by way of example only; other calendar views that provide for the display of calendar events or reminders are also contemplated and within the inventive concepts herein disclosed. Alternatively, the calendar view may be generated by another calendar or personal planner application, in which case, the calendar view is imported into the media diary application from the auxiliary calendar application.

The calendar view 500 includes date columns 510, which correspond to a specific date. In the example shown, three date columns are visible on the display corresponding to the current date (i.e., Wednesday, 19 June) and the subsequent two dates. Typically, upon activation of the calendar view the current date will be displayed in the left-hand column of the calendar view with columns for the subsequent dates positioned sequentially to the right. As will be apparent, the calendar view may be differently oriented, such as with rows as opposed to columns or the current date may be displayed in the right hand column, if so desired. In an alternate embodiment the calendar view may include columns 510, which may correspond to any moment of time, such as year, month, day, hour or the like. Additionally upon activation of the calendar view the current moment of time may be displayed on the middle of the view.

The date columns 510 include multiple time blocks 520, which provide a descriptive area for information related to calendar events 530. In the embodiment shown, the time blocks correspond to one-hour time blocks, although the blocks may be for other lengths of time, such as 30-minute blocks. Further, for example if a column represents a year, the time block 520 may represent a month. The calendar view will be vertically scrollable, so that, all of the time blocks for a date column will be viewable by the user. In addition, the calendar view will typically be horizontally scrollable to provide for a view of other date or time columns 510. In addition, the time blocks may include reminder icons 540, which provide the media diary user a visual reminder related to an upcoming calendar event. For example in the depicted embodiment, the camera icon reminds the user that calendared event requires or will benefit from a having a camera on-hand.

The information related to calendar events 530 will typically be inputted by the user and include information, such as title of the event, topic of the event, date and time of the event, location of the event, individuals attending the event and the like. A calendar event may be inputted by activating, via keystroke or mouse-type input signal, the time block associated with the event. Upon activation, a window or view is made visible that allows for the user to input information related to the event. Once the calendar event has been inputted and text displayed in the time block, the details of the calendar events may be accessible by activating, via keystroke or mouse-type input signal, the calendar event. In addition to manually inputting calendar events, the media diary may import calendar events from other sources or applications that are being executed on the digital device, such as from other, internal or external, personal planner or calendar applications, email systems or the like.

Further, the information related to a calendar event 530 creates metadata information related to the calendar event or reminder. The metadata related to the calendar event will be correlated with metadata associated with media files related to the calendar event. In this regard, the media diary is able to automatically associate a media file with and an event and create comprehensive metadata for the media file. In addition, the present invention may correlate the metadata associated with the slave device that created and/or communicated the media file to the master device (i.e., the device implementing the media diary application). The comprehensive metadata provides a searchable database for locating the media file within the media diary.

The time blocks 520 may include a time now identifier 550 that may be accentuated in bold-faced type or other way graphically accentuated in the time block that includes the current time. The time now identifier serves to indicate the current moment of time. The time now identifier will be an active identifier that displays the current time, in hour and minutes, and moves forward to the next time block with the passage of time. In addition, the calendar view 500 may graphically distinguish between time blocks and calendar events that are in the past and time blocks and calendar events that are in the future. In the illustrated example, time blocks and events in the past are designated by italicized text and time blocks and events in the future are designated by non-italicized, standard text. As the time now identifier moves to the next time block to indicate the passage of time, the distinguishing graphics of the time blocks and calendar events will also change to indicate the proper time state.

The media view 600 portion of the media diary view 400 provides for digital media files, such as digital images, digital video, digital audio, computer games, computer software, digital text files, emails, short message service (SMS) messages, multimedia message service (MMS) messages or the like, to be accessible to the media diary user, in accordance with an embodiment of the present invention. Typically the media files that are represented in the media view will be associated to a past calendar event or past reminder. It is noted that the media view herein depicted and described is by way of example only; other media views that provide for the display of media file representations in association with a moment of time or a time period are also contemplated and within the inventive concepts herein disclosed. Alternatively, the media files that are represented in the media view may be associated with a moment or period of time based on a timestamp in the media file, without having noted an event related to the media file, in advance, in the calendar view or application.

The media view of the illustrated embodiment includes date columns 610, which correspond to a specific date, although the media view may be differently oriented if so desired. In the example shown, four date columns are visible on the display corresponding to the four previous dates. In an alternate embodiment the media view may include columns 610, which may correspond to any moment of time, such as a year, a month, a week, a day, an hour or the like. The date columns will include media file representations 620 that are related to media files and are connected, in time, to the specific date, event and/or time. For example, the media file representations may include representations that provide the user with access to digital files, such as video files, image files, audio files, computer games, computer software, text files, emails, short message service (SMS) messages, multimedia message service (MMS) messages and the like and provide the user with information pertaining to the content of the files. The media file representations may include an icon, or a thumbnail image, a portion of the text of a text document or message or any other suitable media file representation with or without a title of the media file.

Typically, the media diary will receive the media file from a digital recording function associated with the device or via digital communication from other devices. For example:

1) If the digital device is a cellular telephone that incorporates a digital camera or any other digital device that serves as a digital recording device, a digital media file (i.e., image) may be communicated directly via cellular telephone access from the camera/telephone device to the media diary in another device.

2) If the digital device is an independent digital camera or any other digital recording/storing/playing device and equipped with a wireless or wireline network connection the digital media file may be communicated directly from networked device to a media diary in another device.

3) If the digital device is an independent digital camera or any other digital recording/storing/playing device and equipped with short range digital communication means the digital media file may communicated first to a long range digital communication device (i.e. cellular telephone, a PDA, laptop computer or the like) that then passes the files to another device with a media diary. Alternatively, in proximity, a file transfer may occur directly to another device with a media diary.

4) The media files may be communicated by a physical memory unit/device transferred from one device to another device.

As such, the digital recording/storing/playing device from which the media file is communicated (i.e., the passing device) may include, and implement, the media diary application or may not include the media diary application. If the passing device includes the media diary application, the media files may be processed for media diary purposes prior to communication to other devices.

The communication/synchronization of the media files may be automatic after a creation of a new media file, or after a certain amount of media files have been created. Alternatively, the communication may occur at a selected time or on a request of a user and may include a single media file or a group of media files. The communication/synchronization may occur via any wireless or wireline network communication method, such as for example via SMS, MMS or file transfer. The communication, i.e. synchronization, may also occur from a back end media diary application/device to any digital recording/storing/playing device with or without the media diary application.

The media file will typically have associated metadata, in the form of a timestamp, event name, file name, location information, people in the event or in the media file, objects in the media file, file type, file size or the like. The media file metadata may be automatically inputted by the digital recording device at the time of the creation of the media file or may be manually inputted, such as at the time of creation of the media file or receipt or transfer of the media file. In addition, it is possible for the metadata to previously exist in conjunction with a calendar event in the media diary and to be associated with the digital media file at the moment the file is created, if the device creating the media file executes the media diary application.

Once the media diary receives the media file, the media file metadata is combined and/or correlated with the calendar event metadata information, i.e., the date and time, the name of the event or the like. The combined and/or correlated metadata information is associated and stored with the media file in the media diary, such that, when a user accesses the media file via the media file representation in the media view the user will be presented with the combined metadata and calendar event information. See for example, media file representations 620, in which, a thumbnail image is combined with a title and text entry.

Additionally, media files forming or related to a specific joint group, e.g. based on a specific event or a time period, will be placed in the media view in a joint group 630 under a common title or subject. The joint group heading is typically implemented in the present invention, when the master device assembles a comprehensive media file collection of an event. In the present invention the joint group may be a collection of event related media files received from various slave devices during a bonding period.

As discussed above, once the media diary assembles the collection, the media diary application may be configured to automatically disseminate the media file collection to one or more of the slave devices. The title or subject of the joint group may be manually inputted or may be inherited from metadata related to a calendar event or reminder, or, exclusively, from metadata related to the media file. The last option becomes relevant if the media file does not have a correspondence event or reminder in the associated calendar application.

The timeline view 700 portion of the media diary view 400 provides for a time bar 710 and a time handle 720. The timeline view will be generated by the computer-readable program instructions as implemented in association with a digital device. It is noted that the timeline view herein depicted and described is by way of example only; other timeline views that provide for the display of a timeline in combination with a media view and a calendar view are also contemplated and within the inventive concepts herein disclosed.

The time handle 720 allows the media diary to be scrolled forward in time and backward in time. As depicted, the calendar view 500 displays the current date, indicated by a current time identifier 550, and the two subsequent dates, for example. The media view 600 displays the four previous dates, for example. The time handle is associated with the center most column, that is, in the depicted example, the column associated with the previous day, i.e. Tuesday 18, June. If the time handle is moved from the stationary position to the left, the calendar view, media view and, in some instances the time bar will scroll to the right, such that, more past dates in the media view will be scrolled and displayed. Moving the time handle to the left, such that more past dates in the media view are scrolled and displayed will eventually cause the calendar view to be scrolled out of the timeline view. If the time handle is moved from the stationary position to the right, the calendar view, the media view and, in some instances the time bar will scroll to the left, such that, more future dates in the calendar view will be displayed. Moving the time handle to the right, such that more future dates in the calendar view are scrolled and displayed will eventually cause the media view to be scrolled out of the timeline view. The stationary position may be any predefined position relative to the display, but is usually in the centerline of the media diary display, or in the centerline of the time bar, or, alternatively, in the centerline of the media view. Alternatively, both media view and calendar view may have their own media handles (not shown in the figure), and they may be scrolled independently.

The time bar 710 allows the device user to focus in on specific dates. In the example shown, the bold cased blocks 730 may indicate weeks and the individual vertical lines 740 within the blocks may indicate ranges for specific dates on which media files currently exist. A space between the ranges indicates the amount of media files associated or stored on a specific date. Different days may be graphically altered, e.g. by different shading and/or color, to distinguish them from each other. For example, every second day may have dark shading and every third day may have light shading. Different weeks may also be graphically altered, e.g. by different shading and/or color, to distinguish them from each other.

As previously noted, other media diary applications that provide the capability of correlating metadata from amongst media files, slave devices and/or calendar events and provide for creation and dissemination of a comprehensive media file collection are also within the inventive concepts herein disclosed and may be implemented in conjunction with the media file sharing system of the present invention.

Thus, the present invention provides for a system for bonding devices within the general vicinity of one another and communicating media files from one device to another, such that the communicated media files can be assembled in a collection and the metadata associated with the devices and the files can be correlated and combined in a master metadata file. The collection of media files and/or master metadata file can then be communicated back to the bonded device or communicated to other non-bonded devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for wireless bonding of devices and communicating media file transfer parameters, the method comprising:

monitoring, at a master device, an area of interest for the presence of potential bondable devices;

receiving, at the master device, a presence signal from a potential bondable device;

determining bond capability of the potential bondable device;

approving the potential bondable device as a bonded device; and communicating, from the master device to the bonded device, media file transfer parameters, including definition of the media file metadata that is to be included with a captured media file.

2. The method of claim 1, wherein communicating, from the master device to the bonded device, media file transfer parameters occurs during the bond approval process.

3. The method of claim 1, wherein communicating, from the master device to the bonded device, media file transfer parameters occurs after the bond approval process.

4. The method of claim 1, wherein communicating, from the master device to the bonded device, media file transfer parameters, further includes one or more destination addresses for communicating captured media files.

5. The method of claim 1, wherein communicating, from the master device to the bonded device, media file transfer parameters, further includes one or more destination addresses for communicating captured media files, wherein at least one of the destination addresses is the master device address.

6. The method of claim 1, wherein communicating, from the master device to the bonded device, media file transfer parameters, further includes one or more destination addresses for communicating captured media files, wherein at least one of the destination addresses is an intermediary device address.

7. The method of claim 1, wherein determining a bond capability of the potential bondable device occurs at the master device.

8. The method of claim 1, wherein determining a bond capability of the potential bondable device occurs at the potential bondable device.

9. The method of claim 1, wherein approving the potential bondable device for bonding occurs at the master device.

10. The method of claim 1, wherein approving the potential bondable device for bonding occurs at the potential bondable device.

11. A method for communicating media files and associated media file metadata from a bonded device to a master device, the method comprising:

bonding one or more slave devices to a master device according to predetermined media file transfer parameters communicated to the slave device from the master device; and communicating a plurality of media files from the one or more bonded devices to the master device, the plurality of media files having metadata information as defined by the predetermined media file transfer parameters.

12. The method of claim 11, further comprising combining, at the master device, the plurality of media files into a master media file.

13. The method of claim 11, further comprising combining, at the master device, the metadata information of the plurality of media files into a master metadata file.

14. The method of claim 12, further comprising communicating the master media file to one or more of the slave devices.

15. The method of claim 12, further comprising communicating the master media file to one or more non-bonded devices.

16. The method of claim 11, further comprising recording, at the master device, metadata information related to the one or more bonded devices.

17. The method of claim 16, further comprising correlating, at the master device, the bonded device metadata information with the media file metadata information.

18. A method for communicating media files and associated media file metadata from a master device to a bonded device, the method comprising:

bonding one or more remote devices to a master device according to predetermined media file transfer parameters;

recording, at the master device, bonded device metadata information;

receiving a media file at the master device from one or more of the bonded remote devices, the media file having associated media file metadata information; and communicating the media file, the media file metadata and the bonded device metadata information from the master device to one or more of the bonded devices or to another remote device.

19. The method of claim 18, further comprising combining, at the master device, the bonded device metadata information and the media file metadata information.

20. The method of claim 18, wherein bonding one or more remote devices to a master device according to predetermined media file transfer parameters further defines the predetermined media file transfer parameters as including criteria for bonding a device.

* * * * *